Figure 1:
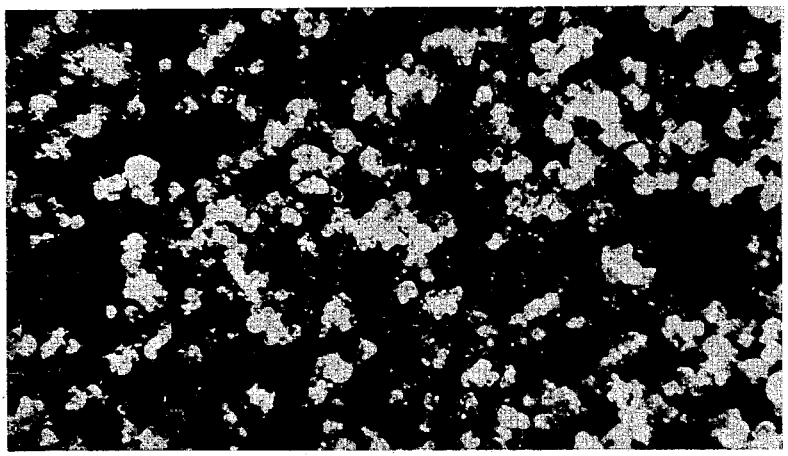

May 3, 1938.   S. L. HANDFORTH ET AL   2,115,851
PROCESS FOR PRODUCING AMMONIUM NITRATE
Filed Jan. 10, 1935   2 Sheets-Sheet 2
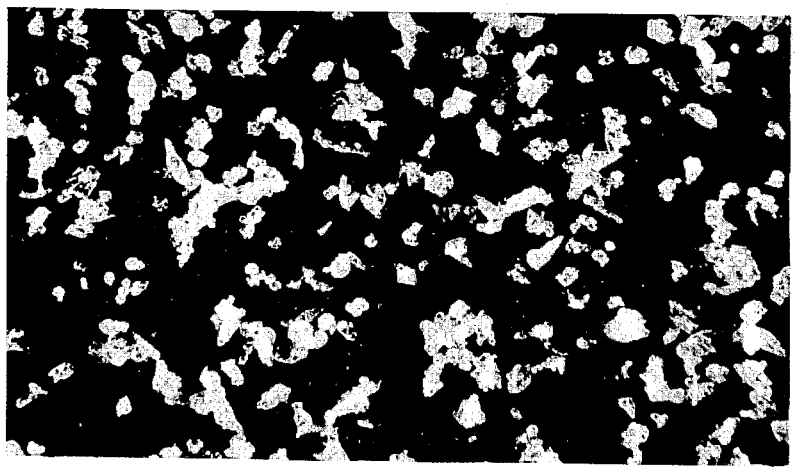
Fig. 3
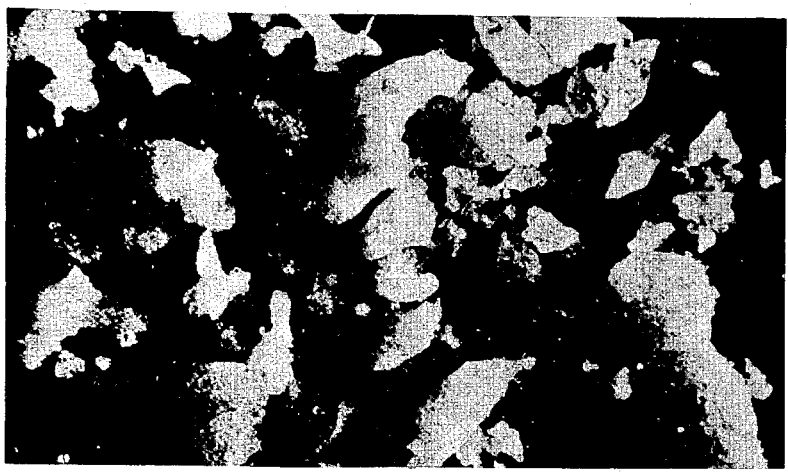
Fig. 4
Stanley L. Handforth   Inventors
Kenneth C. Simon
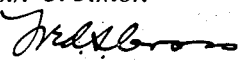
Attorney Patented May 3, 1938

2,115,851

UNITED STATES PATENT OFFICE 2,115,851

PROCESS FOR PRODUCING AMMONIUM NITRATE

Stanley L. Handforth and Kenneth C. Simon, Woodbury, N. J., assignors to E. I. du Pont de Nemours & Company, Wilmington, Del., a corporation of Delaware Application January 10, 1935, Serial No. 1,109

5 Claims. (Cl. 23—1.03)

This invention relates to a process for producing solid ammonium nitrate in granular form, and more particularly to a process for producing such granules of predetermined density and degree of fineness by control of various operating conditions.

Ammonium nitrate is customarily made by the neutralization of aqueous nitric acid with ammonia, which step gives an aqueous solution of ammonium nitrate of varying strengths depending on several factors. In order to obtain a dry salt, removal of the water present is necessary. This may be brought about by a preliminary evaporation process and subsequent crystallization of the ammonium nitrate from the concentrated solution. The ordinary procedure, however, is by evaporation only, usually in more than one step. For example, a common method has been to evaporate the ammonium nitrate solution, after its removal from the neutralization vessel, to a relatively low water content, 2 to 10%, in containers in which a large surface of solution is exposed. This molten mass is then cooled with agitation, in order to obtain a grained product, and the remaining water is removed by evaporation or drying at a lower temperature.

The object of our invention is an improved process for controlling the physical properties of relatively dry ammonium nitrate produced by spraying a concentrated solution of this salt, in order to form it into particles of small size. A further object is such a process wherein a final material is obtained, of varying but predetermined density and degree of fineness, by a systematic control of various operating conditions. Additional objects will be disclosed as the method is described further hereinafter.

We have found that solid dry ammonium nitrate can be produced of the desired degree of fineness and density by passing a highly concentrated solution of this salt, preferably above 97% strength, preferably through distributing openings in a revolving disc, and properly controlling the temperature and concentration of the solution, the rate of feed, and the peripheral speed of the disc. Preferably, the solution is sprayed into air as a cooling medium, supplied at a temperature substantially lower than that of the liquid itself. The resulting material is in the form of solid granules, presenting a non-crystalline appearance. If the solution is sufficiently highly concentrated before spraying, the product will require slight, if any, further drying. Since it is desirable to have the minimum of moisture present, it will be desirable in most cases to dry the product further.

We have found, for example, that a product is produced that is relatively coarse, such that substantially the greater part, over 90% in many cases, will pass a 10-mesh screen but will be retained on a 35-mesh screen, when the spray disc is revolving at a peripheral speed of 15 to 45 feet per second. In the case of a disc of 4.125" effective diameter, for example, this will mean a rotation velocity of approximately 900 to 2700 R. P. M.

To produce a much finer grade of material, such that substantially the greater part will pass through a 35-mesh screen, the peripheral speed is in excess of 110 feet per second. With the above mentioned disc diameter, this will mean a rotating speed of over 6,000 R. P. M. The size of particles can be controlled to various intermediate degrees of fineness by varying peripheral speed between the values just given.

The peripheral speed is calculated from the revolutions per minute and the effective diameter of the disc. By the term "effective diameter" is not necessarily meant the diameter from the extreme edge of the disc, but, for example, in case the disc has distributing openings, through which the liquor is passed to the extreme edge, the effective diameter will be from the outer edge of these openings. Hence, the peripheral speed is intended to designate the speed at the distributing openings.

In obtaining controlled variations of the fineness and the density of the sprayed ammonium nitrate granules, as described in the foregoing, we find it desirable with a disc of 4.125" diameter to use a rate of feed of approximately 155 lbs. per hour per inch of periphery. As the rate of feed is increased, the tendency, with the same peripheral speed, is toward the production of a coarser product. This increase in particle size can be substantially overcome by a further rise in the peripheral speed of the disc.

In addition to a controlled size of particle, the apparent density of the material may be varied and controlled to the value desired, by a suitable regulation of the temperature and concentration of the solution to be sprayed. Using for example a disc, as described in the foregoing, rotating with a peripheral speed in excess of 110 feet per second, a fine product is produced of an apparent density between 0.55 and .80, by causing a solution having a concentration such that it has a solidification point of 142 to 148° C., namely of 97.6 to 98.2% strength, to pass through the spraying device at a temperature sufficiently high to assure fluidity during its transit. Preferably, this temperature will be relatively close to the solidification point, for example 147 to 153° C.

Under such conditions, where the solution has a high concentration and possesses only the fluidity necessary to make spraying possible, low density is obtained. This may be due either to altered surface tension caused by the water present or because of the fact that the particles assume irregular, distorted shapes and do not have time to assume the form of perfect spheres before solidifying. The limiting factor in reducing the spread between liquid temperature and freezing point is the tendency for solidified solution to adhere to the disc surface. When this occurs, particularly at high speeds, the disc becomes unbalanced and is liable to rupture or to harm the driving motor.

A product of higher density, for example 0.85 to 1.0, is obtained, however, when an ammonium nitrate solution of such concentration that it has a solidification point of 160 to 169° C., namely of 99.5 to 99.9% strength, is sprayed through the disc at a temperature of 175 to 195° C., i. e., appreciably above its solidification point. Under these conditions the particles are all essentially spherical and hence tend to pack together with less voids than is the case when a variety of shapes is present.

The question of the fineness and density of ammonium nitrate is a matter of great significance and the ability to control these properties, according to our invention, is very important. In the case of explosives of the ammonia permissible type, for example, an ammonium nitrate content of 70 to 80% is ordinarily present. The use of coarse ammonium nitrate, under such conditions, produces an explosive of low velocity. This is of great importance in the blasting down of coal, for example, where a low velocity explosive means the production of a higher percentage of lump coal, a result that is frequently much desired. The use of a fine ammonium nitrate, on the other hand, results in explosives having a much higher rate of detonation, which property is particularly desirable for specific types of blasting. In short, a definite method for controlling the particle size of the nitrate of ammonia used in explosives offers a very satisfactory way of controlling the rate of detonation of the final composition.

A great advantage arising from a definite control of density is concerned with the manufacture of low density explosives by a means not available heretofore. The use of this type of ammonia permissibles is desirable, since it allows in many cases a more efficient loading of the bore hole. The production of such explosives has previously been possible only by the substitution of extremely light combustible materials in place of those usually employed. By obtaining the same results from the use of lower density ammonium nitrate, the concurrent advantages are obtained of an explosive of higher strength and improved sensitiveness. Furthermore, since the proportion of ammonium nitrate is large in comparison with that of the combustible, a reduction in the density of the former is much more effective than with the latter.

The low density product of irregular distorted shapes, as described in the foregoing, is a unique composition of matter. It is known that a low density product is obtained by crystallization under certain conditions, but experience has shown that this crystalline material, unlike our product, does not retain its low density characteristics satisfactorily. The crystals break down under treatment of any kind, for example during drying or mixing with other materials, and thereby lose the low density advantage.

The following examples will illustrate specific embodiments of our invention applied to the control of density and fineness of ammonium nitrate.

TABLE I

Control of fineness of ammonium nitrate

| | Coarse | Medium | Fine |
|---|---|---|---|
| Disc speed—R. P. M | 1,200 | 6,000 | 10,800 |
| Peripheral speed—ft./sec | 17 | 98 | 177 |
| Feed rate—lbs./hr | 1,600 | 1,525 | 1,500 |
| Feed concentration | 99.3% | 99.2% | 99.3% |
| Feed temperature | 179° C. | 177° C. | 177° C. |
| Density of product | 0.90 | 0.95 | 0.91 |
| Fineness of product: | | | |
| Held on 35-mesh screen | 80.2% | 3.1% | 0.2% |
| Passed 35, held on 65-mesh screen | 15.3 | 40.3 | 7.5 |
| Passed 65, held on 100-mesh screen | 2.9 | 33.8 | 23.7 |
| Passed 100-mesh screen | 1.6 | 22.8 | 68.6 |

TABLE II

Control of density of ammonium nitrate

| Fineness density class | Coarse No. 2 | | Medium No. 3 | | Fine No. 4 | |
|---|---|---|---|---|---|---|
| | High | Low | High | Low | High | Low |
| Disc speed—R. P. M | 1,200 | 1,200 | 6,000 | 6,000 | 10,800 | 10,800 |
| Peripheral speed—ft./sec | 19.6 | 19.6 | 98 | 98 | 218 | 218 |
| Feed concentration | 99.3% | 97.8% | 99.2% | 97.8% | 99.3% | 97.8% |
| Feed temperature | 177° | 156° | 177° | 156° | 174° | 150° |
| Apparent density | 0.90 | 0.65 | 0.95 | 0.70 | 0.94 | 0.74 |
| Illustrated in fig | 2 | 4 | | | 1 | 3 |

Figure 2:
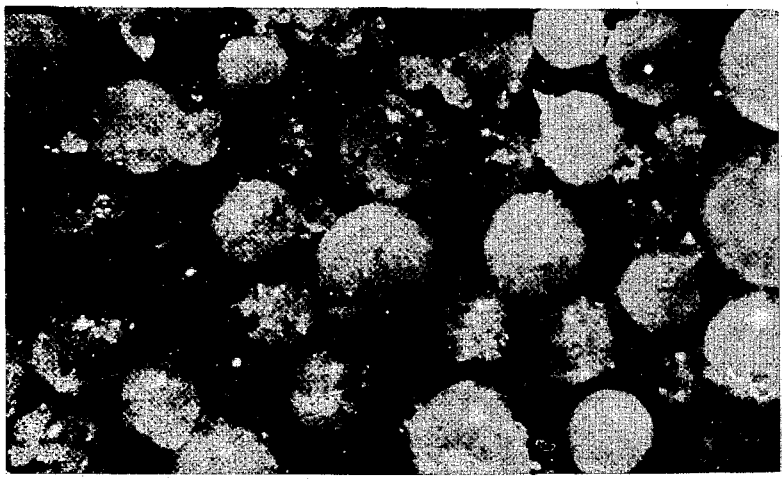

The accompanying drawings illustrate varying forms of ammonium nitrate which have been produced in accordance with our invention, in which Figure 1 represents a fine, substantially spherical product while Figure 2 represents the coarse spherical product. Figure 3, on the other hand, represents the fine grade of irregular or distorted shapes, while Figure 4 represents the coarse grade of the irregular or distorted particles. The products represented by the foregoing illustrations are taken from actual photographs of the product enlarged many diameters. These products are well adapted for producing a variety of ammonium nitrate explosives, and the particle size and formation enables one to produce explosive compositions of predetermined density with accurate control.

The higher density material obtained by our process will, in general, be in the form of solid spheres of ammonium nitrate the size of these depending on the speed of the spray disc. With lower densities, however, the material will comprise a substantial amount of irregular shapes.

We are aware of the fact that spray processes for producing ammonium nitrate have heretofore been disclosed, such for example as the process of U. S. Patent 1,613,334, to E. M. Symmes. The process disclosed in that patent, however, contemplates the use of a stationary nozzle which in the production of ammonium nitrate does not give the advantage of controlled fineness and particle sizes by regulation of the spray disc which is accomplished by the present invention. Moreover, the Symmes process does not take into consideration the advancement attained by spraying the solution of ammonium nitrate at a temperature as near as practicable to the freezing point of the solution to produce a low density product.

The term "apparent density" as used herein is intended to include or cover "bulk density" and is determined by introducing the material into a brass cylinder having the approximate inside dimensions of 31 cm. length and 5 cm. diameter and an approximate volume of 632 cc. Increments of ammonium nitrate amounting to one-fifth the volume of the cylinder are introduced in separate portions and after each addition the material is pressed down by the dead weight of a 16-pound weight resting on a wooden tamp. The apparent density is taken as the weight of the ammonium nitrate in grams divided by the volume of the cylinder in cubic centimeters.

While we have described our new process in considerable detail in the foregoing and have given several specific embodiments for illustrative purposes, it will be apparent that many variations and embodiments within the broad principles of the invention will now suggest themselves to those skilled in the art. We therefore do not intend to be limited except as indicated in the following patent claims.

We claim:

1. The method of producing solid ammonium nitrate in predetermined size particles having a predetermined density between 0.55 and 0.80 and of such degree of fineness that substantially the greater part will pass a 10-mesh screen, but will be retained on a 35-mesh screen, which comprises spraying a solution of the ammonium nitrate by means of a disc revolving at a peripheral speed of 15 to 45 feet per second while maintaining the temperature of the solution supplied to the spray disc substantially at the solidification point, but sufficiently high to assure fluidity, and the concentration of the solution within a solidification point range between 142 and 148° C.

2. The method of producing solid ammonium nitrate in predetermined size particles having a predetermined density between 0.85 and 1.0, and of such degree of fineness that substantially the greater part will pass a 10-mesh screen but will be retained on a 35-mesh screen, which comprises spraying a solution of the ammonium nitrate by means of a disc revolving at a peripheral speed of 15 to 45 feet per second while maintaining the temperature of the solution between 175 and 195° C. and the concentration of the solution within a solidification point range between 160 and 169° C.

3. The method of producing solid ammonium nitrate in particles having a predetermined density between 0.55 and 1.0, which comprises spraying, by means of a disc revolving at a peripheral speed of 15 to 45 feet per second, a solution of the ammonium nitrate while maintaining the freezing point of the solution between 142 and 169° C. and the temperature of the solution supplied to the spray disc between 147 and 195° C.

4. The method of producing solid ammonium nitrate having a predetermined density between 0.55 and 0.80 in particles of such a degree of fineness that substantially the greater part will pass through a 60-mesh screen, which comprises spraying by means of a disc revolving at a peripheral speed in excess of 110 feet per second a solution of ammonium nitrate, maintaining the temperature of the solution supplied to the spray disc substantially at the solidification point, but sufficiently high to assure fluidity during passage through the disc, while maintaining the concentration of the solutions with a solidification point range between 142 and 148° C.

5. The method of producing solid ammonium nitrate having a predetermined density between 0.85 and 1.0, in particles of such a degree of fineness that substantially the greater part will pass through a 60-mesh screen, which comprises spraying by means of a spray disc a solution of ammonium nitrate, maintaining the temperature of the solution supplied to the spray disc between 175 and 195° C., while maintaining the concentration of the solution with a solidification point range between 160 and 169° C.

STANLEY L. HANDFORTH.
KENNETH C. SIMON.